US 8,090,271 B2

United States Patent
Qian et al.

(10) Patent No.: US 8,090,271 B2
(45) Date of Patent: Jan. 3, 2012

(54) DIFFERENTIAL DELAY RECEIVER USING CROSS-POLARIZATION INTERFEROMETER FOR POLMUX-DPSK SYSTEM

(75) Inventors: Dayou Qian, Cranbury, NJ (US); Ting Wang, Princeton, NJ (US); Lei Xu, Princeton, NJ (US); Philip Nan Ji, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 664 days.

(21) Appl. No.: 12/236,694

(22) Filed: Sep. 24, 2008

(65) Prior Publication Data
US 2009/0274460 A1 Nov. 5, 2009

Related U.S. Application Data

(60) Provisional application No. 61/049,510, filed on May 1, 2008.

(51) Int. Cl.
*H04B 10/06* (2006.01)
(52) U.S. Cl. ...................................................... 398/202
(58) Field of Classification Search .................. 356/519; 359/484.07
See application file for complete search history.

(56) References Cited

U.S. PATENT DOCUMENTS

| 7,076,169 | B2 * | 7/2006 | Shpantzer et al. ............... 398/76 |
| 7,515,832 | B2 * | 4/2009 | Kikuchi .......................... 398/161 |
| 2006/0024064 | A1 * | 2/2006 | Hecker et al. .................. 398/152 |
| 2007/0025737 | A1 * | 2/2007 | Kamio et al. ................... 398/150 |

* cited by examiner

*Primary Examiner* — Jessica Stultz
*Assistant Examiner* — Tuan Nguyen
(74) *Attorney, Agent, or Firm* — James Bitetto; Joseph Kolodka

(57) ABSTRACT

A differential delay detection system and method includes an optical splitter to split an incoming optical signal between a first path and a second path. The first path includes a cross-polarization interferometer configured to separately generate polarization independent outputs using split paths and to generate cross-polarization interference outputs, and a polarization demultiplexer configured to combine the polarization independent outputs and the cross-polarization interference outputs from the cross-polarization interferometer with updated coefficients received from the second path to remove the cross-polarization mixed signals. The second path includes a training signal receiver configured to compute the updated coefficients and output the updated coefficients to the polarization demultiplexer.

11 Claims, 5 Drawing Sheets

DIFFERENTIAL DELAY RECEIVER USING CROSS-POLARIZATION INTERFEROMETER FOR POLMUX-DPSK SYSTEM

RELATED APPLICATION INFORMATION

This application claims priority to provisional application Ser. No. 61/049,510 filed on May 1, 2008 incorporated herein by reference.

BACKGROUND

1. Technical Field

The present invention relates to optical transmission systems and more particularly to a polarization multiplexing system and method to increase system capacity in optical transmission systems.

2. Description of the Related Art

As the demand on capacity rapidly increases, spectral efficiency (SE) is becoming increasingly more important for high speed optical transmission systems. To achieve high SE, polarization multiplexing (PolMux) is a technology of interest since PolMux works well with any modulation format and can increase the spectral efficiency from the original SE of the modulation format without PolMux. PolMux requires changes to a transmitter side by adding the polarization beam combiner (PBC), and needs coherent detection as the only option at a receiver side. This results in a high complexity and has not been technically proven for practical systems.

In a coherent detection receiver, both frequency offset and phase offset need to be removed by digital processing which requires a large amount of power consumption and complicated system design. The coherent detection receiver also needs spare narrow line-width lasers at the receiver as a local oscillator which can increase both system cost and complexity.

SUMMARY

A differential detection receiver overcomes all of the above issues. There are no frequency offsets or phase offsets coming with a received signal and a local oscillator laser is not required. However, to realize differential detection for a PolMux signal, cross polarization mixed signals has to be reduced or eliminated before the signal can be correctly detected.

A differential delay detection system and method includes an optical splitter to split an incoming optical signal between a first path and a second path. The first path includes a cross-polarization interferometer configured to separately generate polarization independent outputs using split paths and to generate cross-polarization interference outputs, and a polarization demultiplexer configured to combine the polarization independent outputs and the cross-polarization interference outputs from the cross-polarization interferometer with updated coefficients received from the second path to remove the cross-polarization mixed signals. The second path includes a training signal receiver configured to compute the updated coefficients and output the updated coefficients to the polarization demultiplexer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide differential delay detection for polarization multiplexing (PolMux) systems, and in particular for PolMux-differential phase shift keying (DPSK) systems. The differential delay detection can simplify a receiver design, improve system reliability and reduce cost by simplifying signal processing for a frequency offset and a phase offset and removing an expensive narrow line-width local oscillator laser.

In differential delay detection, the data is recovered by finding a phase difference between two consecutive symbols. The first symbol will act as a reference point in this case. Because both symbols come from the same transmitter (CW laser source), their frequencies (wavelengths) are the same and their phase is locked. Meanwhile, there are no frequency and phase offsets. In a coherent system, a local oscillator (LO) and the signal are two free-run lasers, their frequencies may not be the same and are always changing. Their phase is not locked. So the frequency difference would generate frequency offset and the phase difference can generate phase offset.

Through simulation, it has been proven that the cross-delay differential detection in accordance with the present principles can recover polarization rotation very well. The inventors are unaware of any differential-detection solution for PolMux-DPSK systems. Coherent detection is currently the only option at the receiver side. In accordance with an illustrative embodiment, a 4-path butterfly cross-polarization differential delay (Mach-Zehnder) interferometer is employed to process the differential detection when signals are transmitted at two orthogonal polarizations. Two additional cross-polarization differential delay outputs can help to remove the cross-polarization mixed signals generated by the random polarization de-multiplexing (PolDeMux) at the receiver.

Embodiments described herein may be entirely hardware, entirely software or including both hardware and software elements. In a preferred embodiment, the present invention is implemented in hardware but may include software components, which may include but are not limited to firmware, resident software, microcode, etc.

Figure 1:
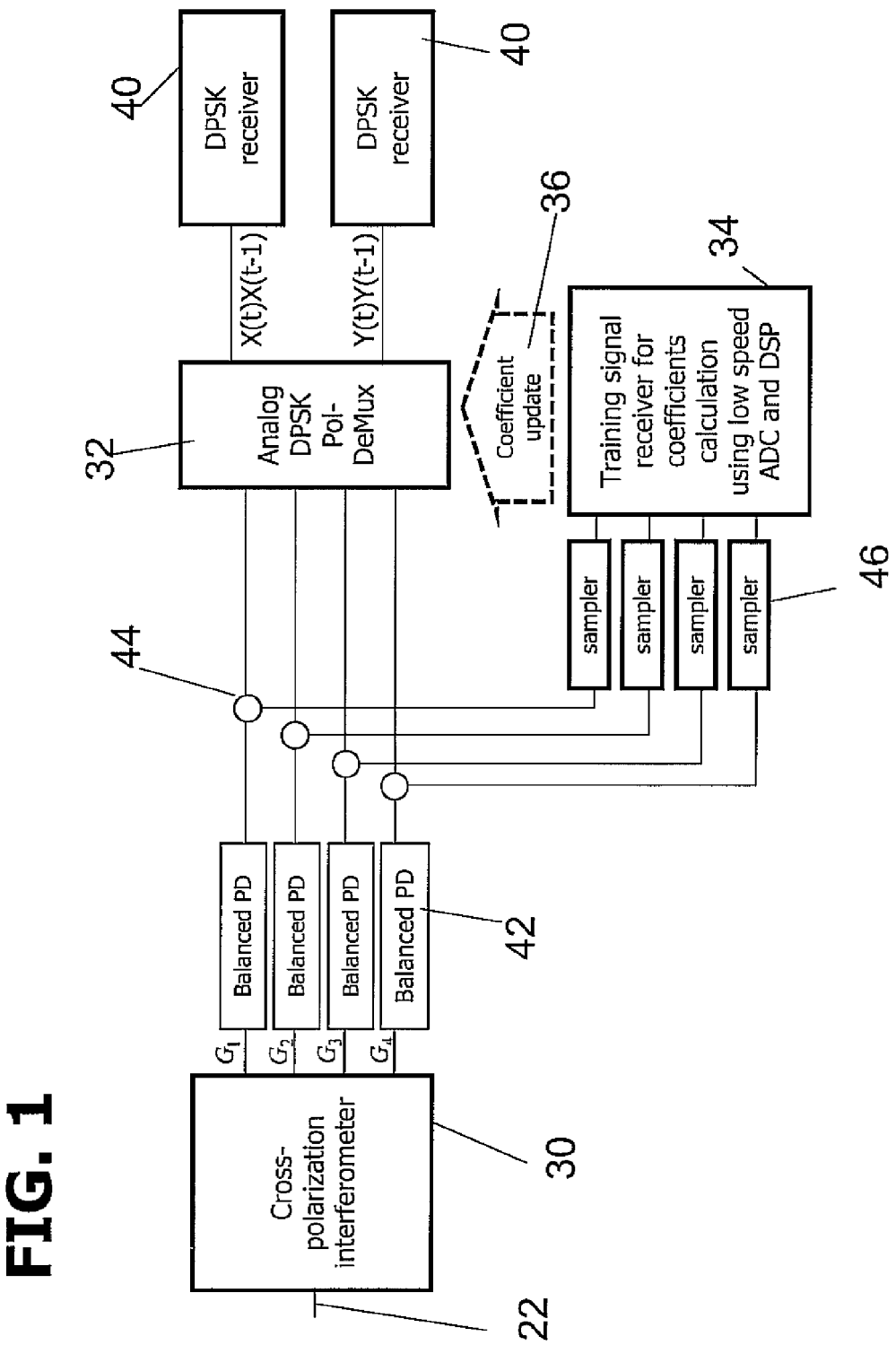
FIG. 1 is a block diagram showing a differential delay detection architecture with a cross-polarization interferometer and a polarization demultiplexer in accordance with one illustrative embodiment.

Referring now to the drawings in which like numerals represent the same or similar elements and initially to FIG. 1, a differential delay detector architecture 10 is shown in accordance with one illustrative embodiment. Architecture 10 illustratively provides a differential-detection receiver 20 for a PolMux-DPSK system. An incoming PolMux-DPSK signal 22 is passed through a cross-polarization interferometer 30 to generate four differential delay interference signals ($G_{1-4}$) including two for two independent polarizations and two for a cross-polarization part. The four interference signals ($G_{1-4}$) are converted into electrical signals by four optical balanced receivers 42. The four electrical signals are separated by four power splitters 44. One at a time of the four power splitters 44 is passed to a DPSK Polarization Demultiplexer (PolDeMux) 32. The other outputs of the four electrical splitter 44 are sent to four high speed samplers 46 to reduce the symbol rate. The four outputs of the high speed sampler are received by a training signal receiver 34 using low speed analog to digital conversions (ADC) and digital signal processing (DSP) are employed to estimate coefficients which will be used by the DPSK-PolDeMux 32.

Due to the cross-polarization interferences, the training signals (34) have to provide the absolute phase information instead of the phase differential information. To realize this, every receiving training signal is generated by transmitting two consecutive symbols.

Figure 2:
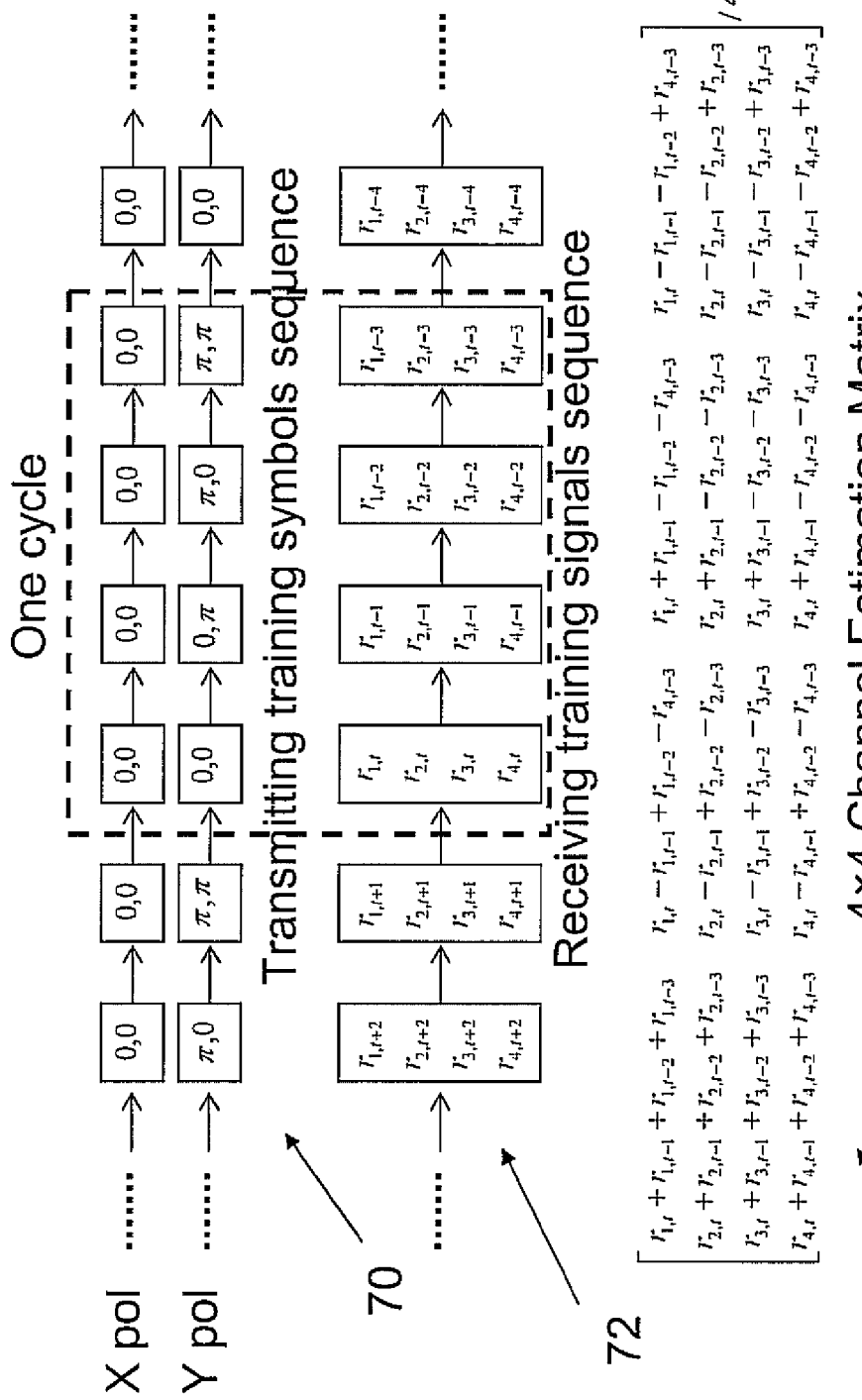
FIG. 2 is a diagram showing transmitted and received training signal sequences along with an estimation matrix.

Referring to FIG. 2 with continued reference to FIG. 1, an example of transmitting signal sequences 70 and receiving training signal sequences 72 are illustratively depicted along with a 4×4 channel estimation matrix 74. In the example, if the desired receiving training signal is "1", the transmitting training symbols could be "00" or "ππ". Each time, the high speed samplers 46 and low speed ADC 34 can capture four training signals for ($G_{1-4}$) respectively. There are four different training signals (X pol: 00, 00, 00, 00; Y pol: 00, 0π, π0, ππ) transmitted periodically. Upon receiving the training signals, a 4×4 channel estimation matrix 74 will be estimated using the latest set of training signals ($r_{i,j}$, where i and j are indexes) with three previous sets. Then, the coefficients for the PolDemux can be updated by finding the inverse matrix of the 4×4 channel estimation matrix 74. The DPSK-PolDeMux 32 uses updated coefficients 36 to recover the received signals hack to the DPSK signal which can be detected directly by a traditional DPSK receiver 40. The DPSK-PolDeMux can be performed with either digital or analog signal processing.

Figure 3:
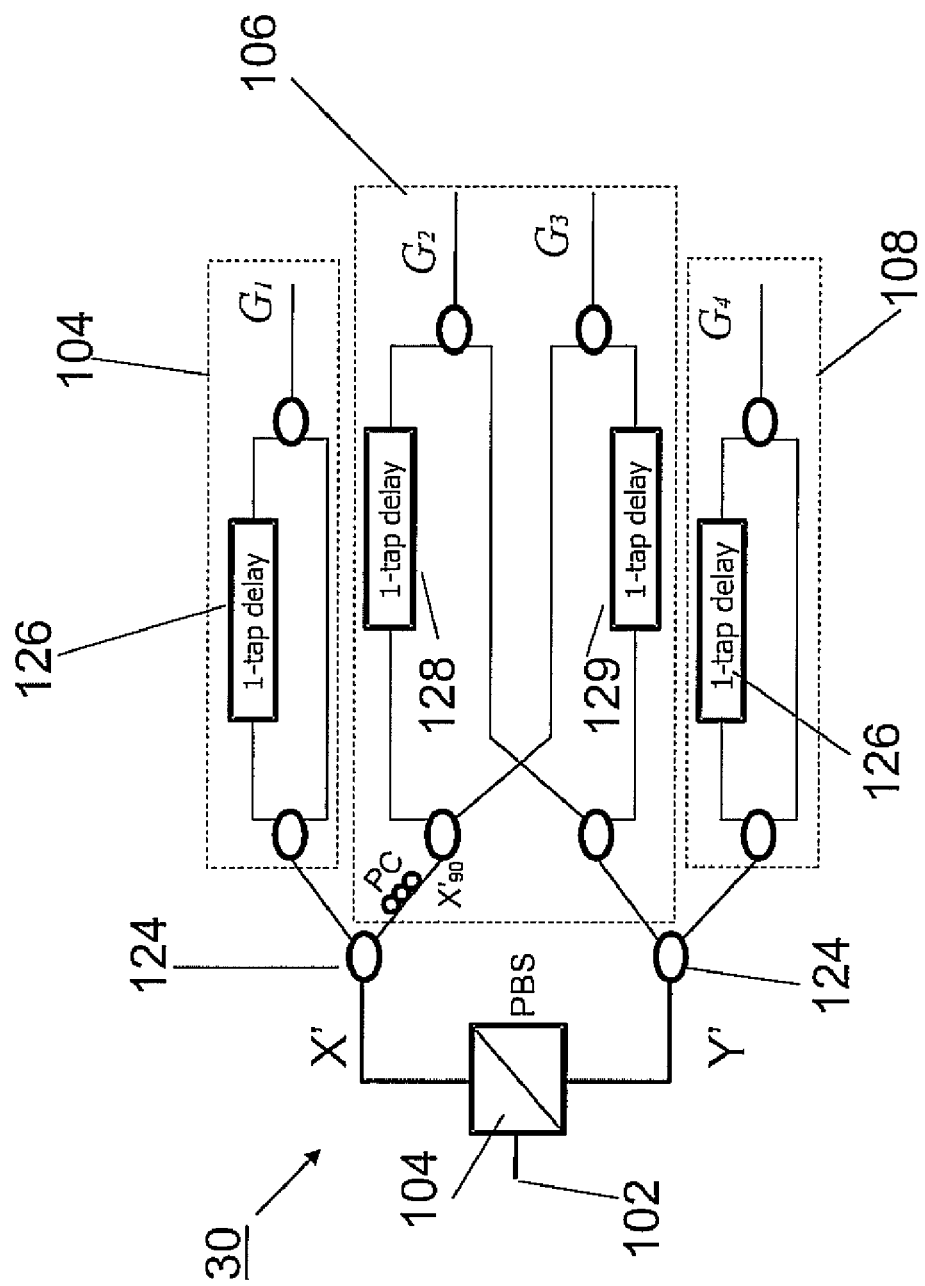
FIG. 3 is a block diagram showing the cross-polarization interferometer of FIG. 1 in greater detail.

Referring to FIG. 3, the cross-polarization interferometer 30 which is employed in the differential detection receiver 20 for the PolMux-DPSK system 10 is shown in greater detail. An incoming PolMux-DPSK signal 102 is randomly separated into two polarization signals (X', Y') orthogonal to each other by a polarization beam splitter (PBS) 104. The two polarization signals are passed through two traditional differential delay interferometers 104 and 108 separately to generate two polarization independent outputs ($G_1$, $G_4$) using split paths where one path include a 1-tap delay 126.

Next, one polarization signal (X') is rotated 90 degrees by a polarization controller (PC) so that the signal becomes the same polarization direction as the other polarization signal (Y'). The 90°-rotated polarization signal ($X'_{90}$) is passed through a 1-tap delay 128 and combined with the other polarization signal (Y') to generate cross-polarization interference output ($G_2$). Similarly, the other cross-polarization interference output ($G_3$) can be generated by adding 1-tap delay 129 to the other polarization signal (Y') and combining with the 90°-rotated polarization signal ($X'_{90}$). All the optical couplers are polarization maintaining couplers 124.

Figure 4:
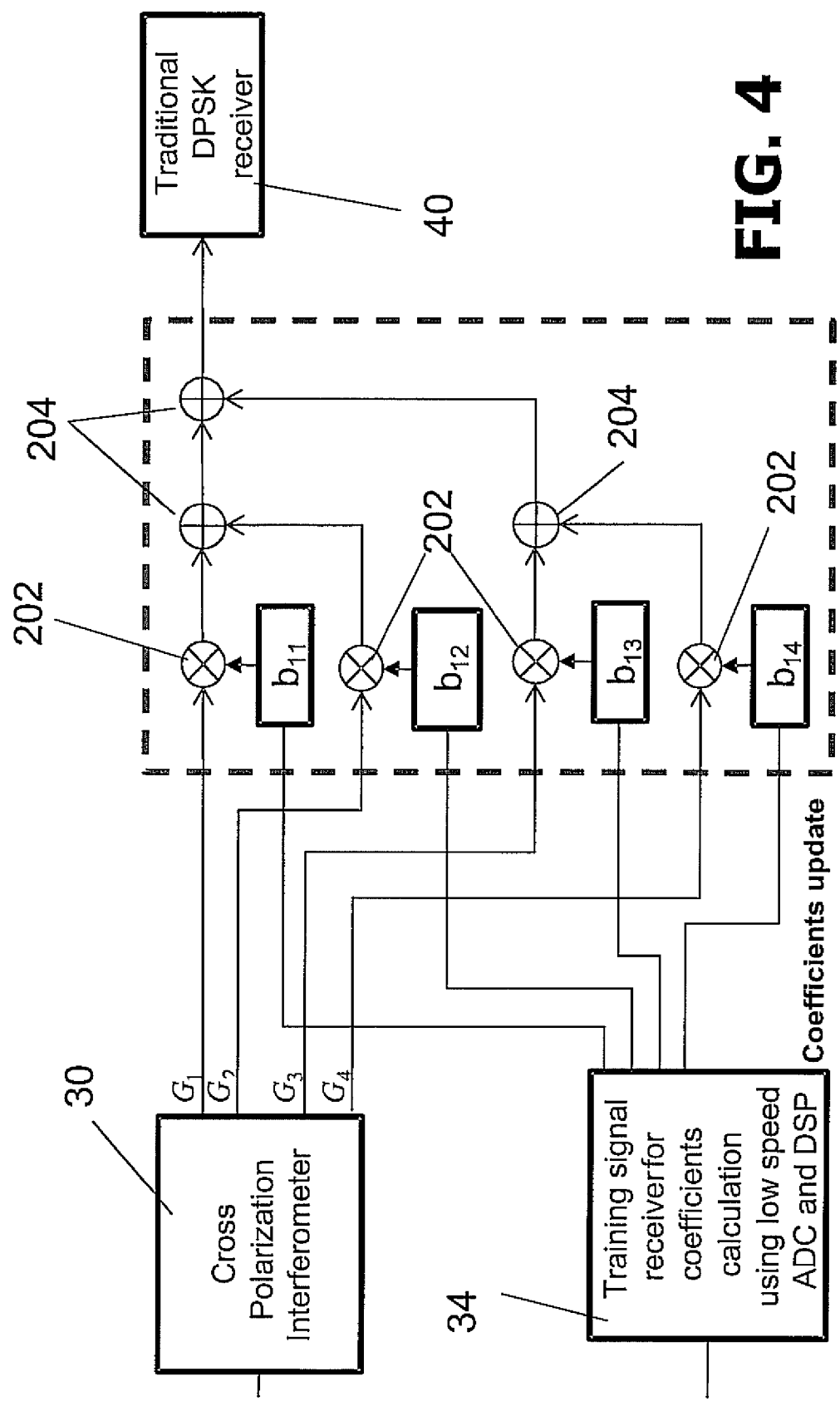
FIG. 4 is a block diagram showing the polarization demultiplexer of FIG. 1 in greater detail.

Referring to FIG. 4, the receiver 20 is shown with the DeMux 32 depicted in greater detail. The DPSK-DeMux 32 can recover the DPSK signal which can be directly detected by the traditional DPSK receiver 40. Simple signal processing has been introduced in DeMux 32 which only needs limited computing resources. The four interference outputs ($G_{1-4}$) of the cross-polarization interferometer 30 are multiplied using multipliers 202 with four independent coefficients $b_{11}$, $b_{12}$, $b_{13}$ and $b_{14}$ estimated by the training signal and then added together using adders 204. The sum will be the recovered DPSK signal on one polarization. Using the same method but different coefficients, the DPSK signal on the other polarization can also be recovered as depicted in FIG. 1.

The differential detection receiver can be easily extended to work for other modulations schemes, e.g., a PolMux-DQPSK (differential quadrature phase shift keying) system using the cross-polarization interferometer method and polarization de-multiplexing as described above.

Referring again to FIGS. 1 and 3, in the receiver 20, the cross-polarization interferometer 30 includes the cross-polarization portions which provide the new features in the differential detection receiver for the PolMux-DPSK system. For PolMux-DPSK system 10, two independent DPSK signals are transmitted through two orthogonal polarizations at the same time. Those two polarizations can be referred to as the original polarization directions. During fiber transmission, the polarizations may rotate and receive different attenuation. At the receiver 20, without knowing the accurate polarization information, the PBS 104 can only separate the PolMux-DPSK signal into two random-selected orthogonal polarizations which could be very different from the original polarization directions. After the PBS 104, each polarization signal includes DPSK signals at both the two original polarization directions.

Using traditional differential delay interferometers, cross-polarization interference will be generated as noise and cannot be removed. However, using the cross-polarization interferometer 30 in accordance with the present principles, two cross-polarization interferences are generated as feasible signals instead of noise so that we can clearly recover both polarization independent interferences and cross-polarization interferences through signal processing. Meanwhile, the cross-polarization interference signal can be removed.

Simulation Results: A random polarization rotation was added between the transmitter and receiver. The present principles were applied and correctly removed cross-polarization interference signals and recovered the desired signals at both polarizations. DGD effects have also been studied for the proposed receiver. From the simulation, the largest tolerated DGD was 15 ps for the 54-Gb/s PolMux-DPSK system which is comparable with the DGD limit of the 27-Gb/s DPSK system.

Therefore, the differential delay detection for PolMux-DPSK system can simplify receiver designs, improve system reliability and reduce cost by simplifying signal processing for frequency offset and phase offset and removing expensive narrow line-width local oscillator lasers. Through simulation, it has been proved that the cross-delay differential detection system and method can recover polarization rotation.

Figure 5:
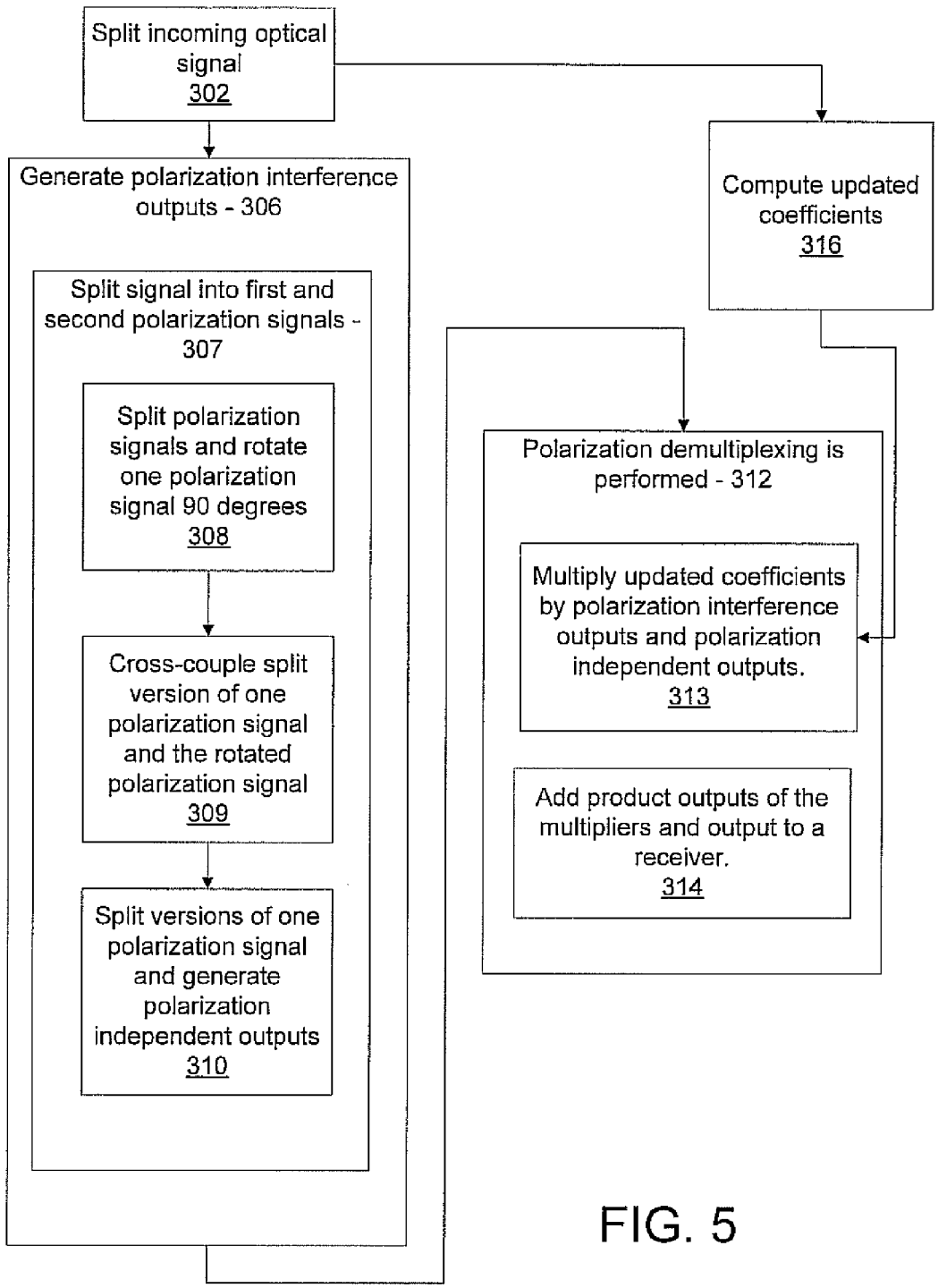
FIG. 5 is a block/flow diagram showing a method for differential delay detection in accordance with illustrative embodiments.

Referring to FIG. 5, a flow diagram illustratively shows a method for differential delay detection in accordance with the present principles in block 302, an incoming optical signal is split between a first path and a second path. The incoming signal may be modulated using, e.g., differential phase shift keying (DPSK) or differential quadary phase shift keying (DQPSK).

In block 306, in the first path, polarization independent outputs ($G_1$ and $G_4$) and cross-polarization interference outputs ($G_2$ and $G_3$) are generated using split paths in a cross-polarization interferometer.

In block 307, the incoming optical signal in the first path is split into a first polarization signal and a second polarization signal. In block 308, the first and second polarization signals further split, and a split version of the first polarization signal is rotated by 90 degrees to form a rotated version of the first polarization signal. In block 309, a split version of the second polarization signal is cross-coupled with the rotated version, and one tap delay branches are employed to combine the with the split version of the second polarization signal and the rotated version to output the cross-polarization interference outputs. In block 310, a split version of the first polarization signal is combined with a one tap delay version of itself, and a split version of the second polarization signal is combined with a one tap delay version of itself to provide the polarization independent outputs.

In block 312, polarization demultiplexing is performed where the polarization independent outputs ($G_1$ and $G_4$) and the cross-polarization interference outputs ($G_2$ and $G_3$) are multiplied by respective updated coefficients received from the second path to remove the cross-polarization mixed signals and restored the original signal.

In block 313, the updated coefficients are multiplied with one of the polarization independent outputs or one of the cross-polarization interference outputs. For example, four interference outputs are multiplied with four independent coefficients estimated by the training signals.

In block 314, product outputs of the multipliers are added by the polarization demultiplexer (e.g., add all four output signals from the multipliers) and are output to a traditional receiver.

In block 316, in the second path, the updated coefficients are computed and output to the polarization demultiplexer using a training signal receiver. This may be performed by employing samplers to determine training signals. Every set of training signals (associated with G1-G4) can jointly work with previous 3 sets to update a 4×4 estimation matrix. An inverse 4×4 matrix is determined and in one embodiment a first row and a last row in the inverse matrix is employed to update the coefficients.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A differential delay detection system, comprising:
an optical splitter to split an incoming optical signal between a first path and a second path;
the first path comprising:
a cross-polarization interferometer configured to separately generate polarization independent outputs using split paths and to generate cross-polarization interference outputs;
a polarization demultiplexer configured to combine the polarization independent outputs and the cross-polarization interference outputs from the cross-polarization interferometer with updated coefficients received from the second path to remove the cross-polarization mixed signals; and
the second path comprising:
a training signal receiver configured to compute the updated coefficients and output the updated coefficients to the polarization demultiplexer;
wherein the first and second polarization signal are further split and the cross-polarization interferometer further comprises a polarization controller configured to rotate a split version of the first polarization signal by 90 degrees to form a rotated version of the first polarization signal and a split version of the second polarization signal and the rotated version are cross-coupled with one tap delays to output the cross-polarization interference outputs.

2. The system as recited in claim 1, wherein the cross-polarization interferometer includes a polarization beam splitter to split a split incoming optical signal into a first polarization signal and a second polarization signal.

3. The system as recited in claim 1, wherein a split version of the first polarization signal is combined with a one tap delay version of itself and a split version of the second polarization signal is combined with a one tap delay version of itself to provide the polarization independent outputs.

4. The system as recited in claim 1, wherein the polarization demultiplexer includes multipliers to multiply the updated coefficients with one of the polarization independent outputs and the cross-polarization interference outputs.

5. The system as recited in claim 4, wherein the polarization demultiplexer includes adders to add product outputs of the multipliers.

6. The system as recited in claim 1, wherein the incoming signal is modulated using differential phase shift keying (DPSK) and the polarization demultiplexer outputs to a DPSK receiver.

7. A method for differential delay detection, comprising:
splitting an incoming optical signal between a first path and a second path;
in the first path, generating polarization independent outputs and cross-polarization interference outputs using split paths in a cross-polarization interferometer;
polarization demultiplexing the polarization independent outputs and the cross-polarization interference outputs from the cross-polarization interferometer to combine with updated coefficients received from the second path to remove the cross-polarization mixed signals;
in the second path, computing the updated coefficients to output the updated coefficients to the polarization demultiplexer using a training signal receiver;
splitting the incoming optical signal in the first path into a first polarization signal and a second polarization signal;
further splitting the first and second polarization signals;
rotating a split version of the first polarization signal by 90 degrees to form a rotated version of the first polarization signal; and
combining a split version of the first polarization signal with a one tap delay version of itself, and combining a split version of the second polarization signal with a one tap delay version of itself to provide the polarization independent outputs.

8. The method as recited in claim 7, further comprising cross-coupling a split version of the second polarization signal and the rotated version with one tap delays to output the cross-polarization interference outputs.

9. The method as recited in claim 7, further comprising:
multiplying the updated coefficients with one of the polarization independent outputs and the cross-polarization interference outputs by the polarization demultiplexer.

10. The method as recited in claim 9, further comprising: adding product outputs of the multipliers by the polarization demultiplexer.

11. The method as recited in claim 7, wherein the incoming signal is modulated using differential phase shift keying (DPSK) and the polarization demultiplexer outputs to a DPSK receiver.

* * * * *